United States Patent
Le Polles

(10) Patent No.: US 12,247,523 B2
(45) Date of Patent: Mar. 11, 2025

(54) DEVICE FOR CONVERTING TO BIOETHANOL, ARRANGED TO PRODUCE A MODIFIED CONTROL SIGNAL

(71) Applicant: FLEX FUEL-ENERGY DEVELOPMENT (FFED), Sophia-Antipolis (FR)

(72) Inventor: Sébastien Le Polles, Montigny sur Loing (FR)

(73) Assignee: FLEX FUEL-ENERGY DEVELOPMENT (FFED), Sophia-Antipolis (FR)

( * ) Notice: Subject to any disclaimer, the term of this patent is extended or adjusted under 35 U.S.C. 154(b) by 0 days.

(21) Appl. No.: 18/553,254

(22) PCT Filed: Mar. 23, 2022

(86) PCT No.: PCT/IB2022/052637
§ 371 (c)(1),
(2) Date: Sep. 29, 2023

(87) PCT Pub. No.: WO2022/208236
PCT Pub. Date: Oct. 6, 2022

(65) Prior Publication Data
US 2024/0183320 A1    Jun. 6, 2024

(30) Foreign Application Priority Data
Apr. 1, 2021  (FR) ..................... 2103387

(51) Int. Cl.
*F02D 19/00*    (2006.01)
*F02D 19/06*    (2006.01)
(Continued)

(52) U.S. Cl.
CPC ....... *F02D 19/066* (2013.01); *F02D 19/0655* (2013.01); *F02D 41/20* (2013.01); *F02D 41/266* (2013.01)

(58) Field of Classification Search
CPC .... F02D 19/066; F02D 19/0655; F02D 41/20; F02D 41/266
See application file for complete search history.

(56) References Cited

U.S. PATENT DOCUMENTS 5,092,305 A * 3/1992 King .................... F02D 41/266 123/1 A
7,305,939 B2 * 12/2007 Carlson ................ F02D 19/066 123/526

(Continued)

FOREIGN PATENT DOCUMENTS

| | | |
|---|---|---|
| FR | 3045729 A1 | 6/2017 |
| GB | 2488814 A | 9/2012 |
| WO | 2020/120807 A1 | 6/2020 |

OTHER PUBLICATIONS

International Search Report for International Application No. PCT/IB2022/052637, mailed Jun. 17, 2022, 6 pages with English translation.

(Continued)

*Primary Examiner* — Phutthiwat Wongwian
*Assistant Examiner* — Sherman D Manley
(74) *Attorney, Agent, or Firm* — Tras kbritt

(57) ABSTRACT

A device, and associated methods, for converting a fuel-injection engine, originally intended for use with a first fuel, allow the engine to operate with a different, second fuel (e.g., bioethanol, alone or mixed with unleaded fuel(s)). The device delivers an adapted injection signal to an injector based on an original injection signal (SI) received from an engine control unit. An analyzing, circuit includes a measuring circuit, to measure the SI; a detecting circuit, to detect (Continued)

an end time of the SI when the measured signal drops below an end threshold; and an updating circuit, to update a value of the end threshold, depending on the measured signal. A signal generator produces a complementary injection signal (SC) starting from the end time. A switching circuit transmits the SI to the injector, then delivers the SC to the injector. The SI and the SC together form the adapted injection signal.

17 Claims, 3 Drawing Sheets

(51) Int. Cl.
*F02D 41/20* (2006.01)
*F02D 41/26* (2006.01)

(56) References Cited

U.S. PATENT DOCUMENTS

| | | | | |
|---|---|---|---|---|
| 7,607,422 | B2* | 10/2009 | Carlson | F02P 5/1518 123/672 |
| 8,136,486 | B2* | 3/2012 | von Beck | F02P 5/1502 123/1 A |
| 8,996,279 | B2* | 3/2015 | Dobeck | F02D 41/30 701/103 |
| 9,567,918 | B2* | 2/2017 | Kjar | F02D 19/0692 |
| 11,053,871 | B1* | 7/2021 | Truax | F02D 41/18 |
| 2004/0111210 | A1* | 6/2004 | Davis | F02D 19/0647 701/104 |
| 2006/0236976 | A1* | 10/2006 | Carlson | F02D 19/061 123/703 |
| 2007/0137620 | A1 | 6/2007 | Couch | |
| 2012/0065867 | A1* | 3/2012 | Dobeck | F02D 41/266 701/103 |
| 2014/0290612 | A1* | 10/2014 | Guinther | C10L 1/231 123/1 A |
| 2015/0198109 | A1* | 7/2015 | Truax | F02D 41/30 123/478 |
| 2018/0128220 | A1* | 5/2018 | Truax | F02D 41/402 |
| 2019/0085776 | A1* | 3/2019 | Tate, Jr. | F02M 21/0275 |
| 2022/0381191 | A1* | 12/2022 | Staykov | F02D 19/0647 |

OTHER PUBLICATIONS

International Written Opinion for International Application No. PCT/IB2022/052637, mailed Jun. 17, 2022, 9 pages with English machine trnaslation.

* cited by examiner

DEVICE FOR CONVERTING TO BIOETHANOL, ARRANGED TO PRODUCE A MODIFIED CONTROL SIGNAL

CROSS-REFERENCE TO RELATED APPLICATIONS

This application is a national phase entry under 35 U.S.C. § 371 of International Patent Application PCT/IB2022/052637, filed Mar. 23, 2022, designating the United States of America and published as International Patent Publication WO 2022/208236 A1 on Oct. 6, 2022, which claims benefit under Article 8 of the Patent Cooperation Treaty to French Patent Application Serial No. FR2103387, filed Apr. 1, 2021.

TECHNICAL FIELD

The disclosure relates to the field of motor vehicles, and more particularly in this field to devices for converting direct or indirect fuel-injection engines initially intended to operate with a first fuel, an unleaded fuel for example, to bioethanol. Such converting devices allow a user to make an engine operate with a second fuel of composition different from a composition of the first fuel, the second fuel being, for example, a bioethanol fuel or a mixture of an unleaded fuel and a bioethanol fuel. Such converting devices more precisely allow the time for which injectors remain open to be controlled, insofar as the use of bioethanol requires additional fuel to be injected to obtain a similar performance to that obtained with an unleaded fuel. These converting devices are designed to be transparent to the usual ECU (acronym of Engine Control Unit) of the engine, which must be able to operate correctly whether or not the device for converting to bioethanol is active, and whether the engine is being powered with unleaded fuel or with bioethanol.

BACKGROUND

As known, such a converting device as described above is arranged to receive an injection signal delivered by the ECU and to transmit, to the injectors of the engine, an adapted injection signal that ensures more fuel is injected into the engine. In order to adapt the original injection signal, the converting device notably takes into account the type of engine and the type of fuel used. The injection signal is most often a current control signal, which allows an injector to be controlled open then to be kept open for a sufficient injection time to deliver to the engine the fuel it needs. Known converting devices are generally specific to a given type of engine, and at the very most only manual adjustment of a parameter using a potentiometer during installation of the converting device in the vehicle is envisioned.

Known converting devices are generally not very effective, notably for the following reasons.

In fuel-injection engines, with which at the present time most motor vehicles on the road are equipped, depending on the technology and on the power of the engine, the injection signals are very specific and differ greatly from one engine or from one type of engine to another, not only in the waveform (also called the wave profile) of the signals, but also in the amplitude and duration of the signals. These signals are periodic signals, with a frequency proportional to engine speed (in rpm). In addition, in a given engine, over a period (also referred to as an injection cycle), the injection signals may in practice vary enormously in amplitude and in duration; they may have a voltage that may reach a few tens to one hundred volts, and a current that may at points be comprised between a few amps and a few tens of amps and that is zero or almost zero at the end of the injection period. Thus, a conventional converting device configured once and for all during its manufacture can be used only for one type of engine, and it is necessary to provide as many converting devices as there are types of engine.

In addition, at the present time, engine manufacturers are optimizing engine operation by developing means for regulating fuel consumption in real time, taking into account the fuel used but also how the engine is used and the conditions of use of the engine. Thus, in motor vehicles, for example, the engine control unit produces the original injection signals taking into account in real time notably the power demanded from the engine and/or engine load and optionally ambient temperature. As a result, the waveform, amplitude and duration of the original injection signals vary in real time in each injection cycle during use of the engine. Under these highly variable conditions a conventional converting device may modify the original injection signal at an inopportune moment during the injection cycle, running the risk of causing needless excess fuel consumption, or even of damaging the engine.

Patent application PCT/EP2019/085468, published as WO 2020/120807 A1 (also referred to herein as "D1"), describes a converting device and method, in which, in each injection cycle, an end time of the original injection signal is detected and the complementary injection signal is delivered to the injector after the end time of the original injection signal. This technical solution improves the time of injection of the complementary signal so that passage from the original signal to the complementary signal is as transparent as possible to the injector.

The waveform, amplitude and duration of the complementary injection signal are also dependent on initial parameters obtained during prior tests on the engine or on a family of engines, and stored in the converting device during installation of the device on the vehicle. This technical solution allows a complementary injection signal that is better adapted to a given engine to be delivered.

However, experiments have shown that this technique is insufficient to optimize operation of the engine and its energy consumption depending on the actual use of the engine.

BRIEF SUMMARY

The disclosure provides a new device for converting a fuel-injection engine initially intended to operate with a first fuel, the converting device allowing a user to make the engine operate with a second fuel of composition different from a composition of the first fuel, the second fuel being, for example, a bioethanol fuel, the new device not having any or some of the drawbacks of known prior-art converting devices such as described above.

To this end, the disclosure provides a new converting device arranged to deliver, on the basis of an original injection signal received from an engine control unit, an adapted injection signal to an injector of the engine.

The converting device according to the disclosure is characterized in that it comprises:
  a circuit for analyzing the original injection signal, comprising a circuit for measuring the original injection signal and a detecting circuit arranged to detect an end time of the original injection signal when the measured signal decreases and drops below an end threshold, a signal generator arranged to produce a complementary injection signal starting from the end time of the original injection signal, and a switching circuit arranged to, in succession, transmit the original injection signal to the injector then deliver the complementary injection signal to the injector, the original injection signal and the complementary injection signal together forming the adapted injection signal.

The converting device, according to embodiments of the disclosure, is characterized in that the analyzing circuit also comprises an updating circuit arranged to update a value of the end threshold depending on the measured signal. The device, according to embodiments of the disclosure, thus allows a complementary injection signal to be delivered at the end of the original injection signal and, by updating the value of the end threshold depending on the original injection signal, the converting device takes into account in real time any variations in the duration of the injection signal throughout operation of the engine; thus, the detection of the end of the original signal is more precise than in prior-art devices, and hence the complementary injection signal is always delivered at the moment that is most opportune for the engine, including during variations in the operating conditions of the engine.

Preferably, the updating circuit is also arranged to determine, in a regulating phase of the original injection signal, a maximum value Vmax and a minimum value Vmin of the measured signal, and arranged to update a value of a high threshold HT and a value of a low threshold LT depending on the maximum value Vmax and on the minimum value Vmin of the measured signal, respectively, and the signal generator may be arranged to produce the complementary injection signal SC such that it varies between the high threshold HT and the low threshold LT. Updating the high and low thresholds in real time allows the amplitude of the complementary injection signal to be adjusted in real time during operation of the engine. The converting device thus delivers, in real time, a complementary signal that has an amplitude as close as possible to the actual amplitude of the original injection signal such as measured in its regulating phase during operation of the particular engine in which the converting device is installed; the complementary signal thus extends the original signal in a manner that is transparent as possible to the engine and under the actual operating conditions of the engine; the effectiveness of the converting device is thus further optimized.

The updating circuit may be arranged to determine, in the regulating phase of the original injection signal, an updated period P of the measured signal, and the signal generator may be arranged to produce the periodic complementary injection signal such that it has a period P. The converting device thus delivers, in real time, a complementary signal that has a waveform (periodic signal) as close as possible to the actual waveform of the original injection signal such as measured; the effectiveness of the converting device is thus further optimized.

According to another embodiment, the updating circuit is arranged to update the value of the end threshold FT, according to the relationship FT=Vmin−E*(Vmax−Vmin), where E is a predefined tolerance parameter.

The disclosure also relates to a converting method comprising using a converting device such as described above.

The disclosure thus provides a converting device that employs self-adapting thresholds, which are updated in real time to take into account real-time operating conditions of the engine. The converting device, according to embodiments of the disclosure, thus produces an optimized adapted injection signal, perfectly adapted to the properties of the second fuel, to the engine and to its real-time operation.

BRIEF DESCRIPTION OF THE DRAWINGS

Embodiments of the disclosure will be better understood, and other features and advantages of embodiments of the disclosure will become apparent, in light of the following description of examples of implementation of the disclosure. These examples are non-limiting. The description should be read with reference to the accompanying drawings, in which.

DETAILED DESCRIPTION

As stated above, the disclosure relates to (FIG. 1) a converting device 1 suitable for converting a fuel-injection engine to a second fuel such as a bioethanol fuel or a mixture of an unleaded fuel and bioethanol fuel. The converting device is arranged to deliver, on the basis of an original injection signal SI received from an engine control unit ECU, an adapted injection signal SM to an injector 5 of the engine.

Figure 1:
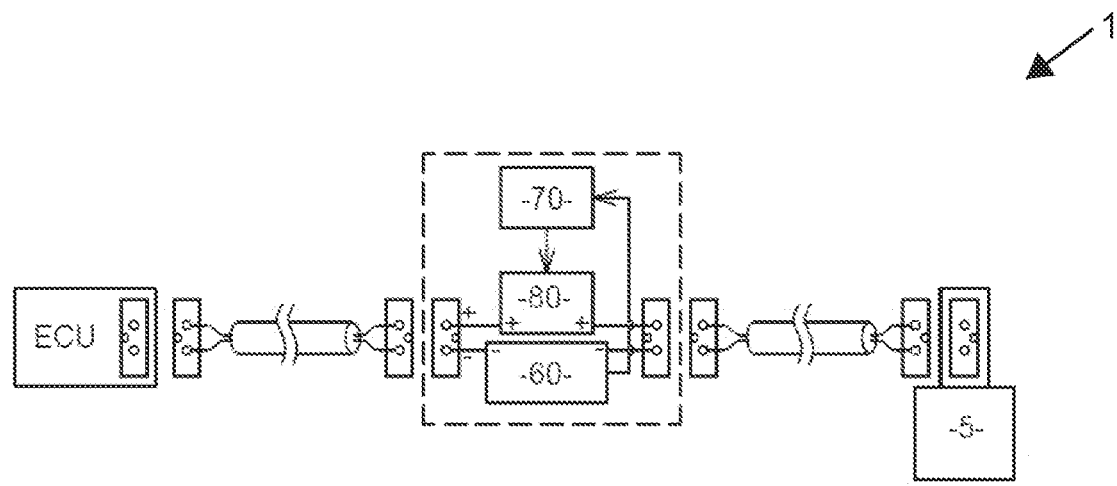
FIG. 1 is a simplified electrical schematic of the device, according to embodiments of the disclosure, in its environment.
Figure 2:
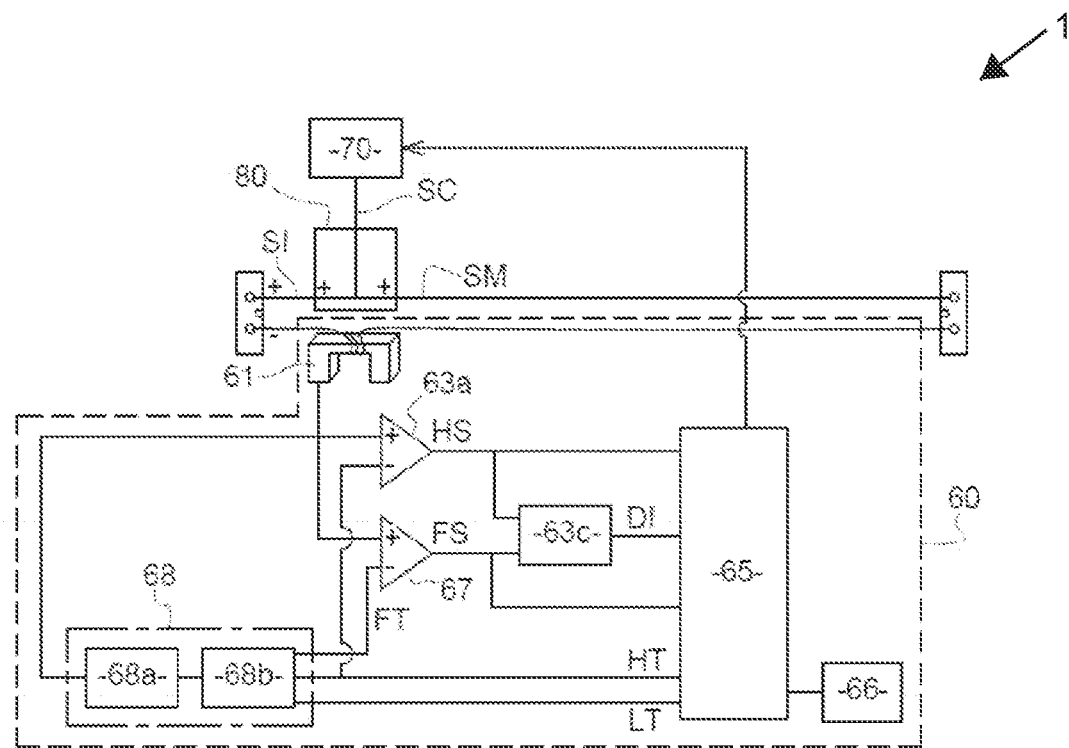
FIG. 2 is an electrical schematic detailing the device, according to embodiments of the disclosure.

FIG. 1 and FIG. 2 show one possible embodiment of a converting device according to the disclosure, deliberately simplified for the sake of clarity.

As in the converting device of D1, a pair of input cables connects the control unit ECU to positive and negative (or ground) input terminals of the converting device (FIG. 1) and a pair of output cables connects positive and negative (or ground) output terminals of the converting device to the injector 5.

The converting device comprises (FIG. 2):

a circuit (60) for analyzing the original injection signal (SI), comprising a circuit (61) for measuring the original injection signal and a detecting circuit (67) arranged to detect an end time (Tf) of the original injection signal when the measured signal decreases and drops below an end threshold (FT), a signal generator (70) arranged to produce a complementary injection signal (SC) starting from the end time of the original injection signal, and a switching circuit (80) arranged to, in succession, transmit the original injection signal (SI) to the injector then deliver the complementary injection signal (SC) to the injector, the original injection signal (SI) and the complementary injection signal (SC) together forming the adapted injection signal (SM).

In the example shown (FIG. 2) the negative input and output terminals of the converting device are electrically connected to each other. The measuring circuit 61 is here arranged to measure the instantaneous current flowing between the negative input and output terminals of the converting device, i.e., in the connection for feeding back the injection signal from the injector 5 to the control unit ECU. The circuit 61 delivers a measured signal that is an image of the original injection signal SI: an amplitude of the measured signal is proportional to an amplitude of the original injection signal SI, and a duration, a period and an end time Tf of the measured signal are identical to a duration, a period and an end time of the original injection signal SI, respectively.

Figure 3:
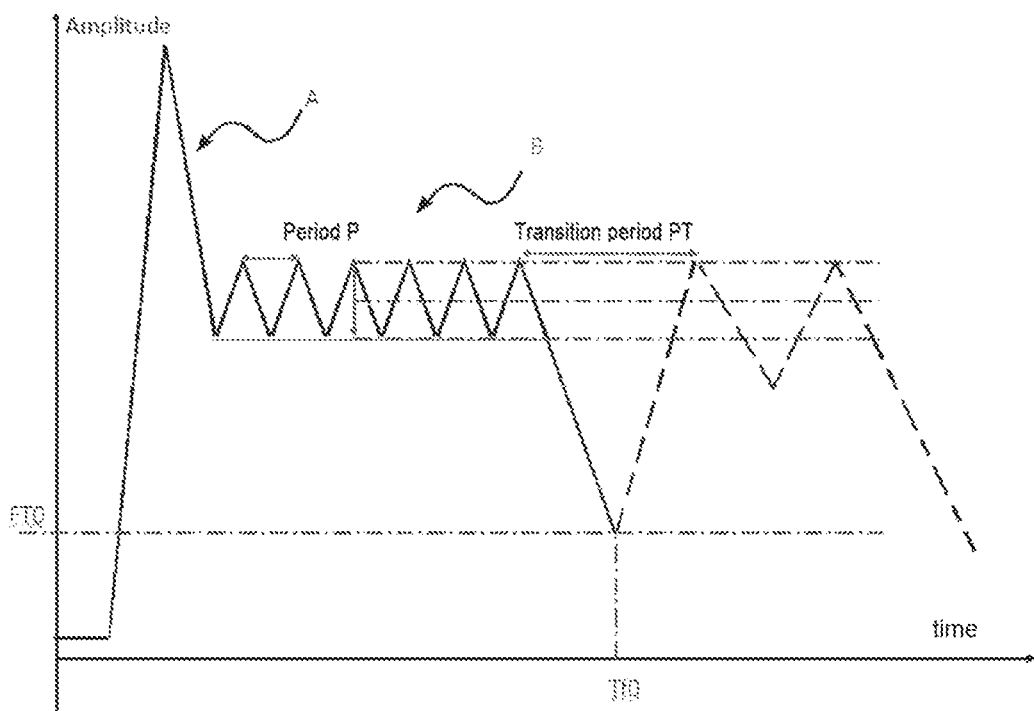
FIG. 3 shows one example of variation in the injection control signal delivered to an injector of an engine, by a known converting device.
Figure 4:
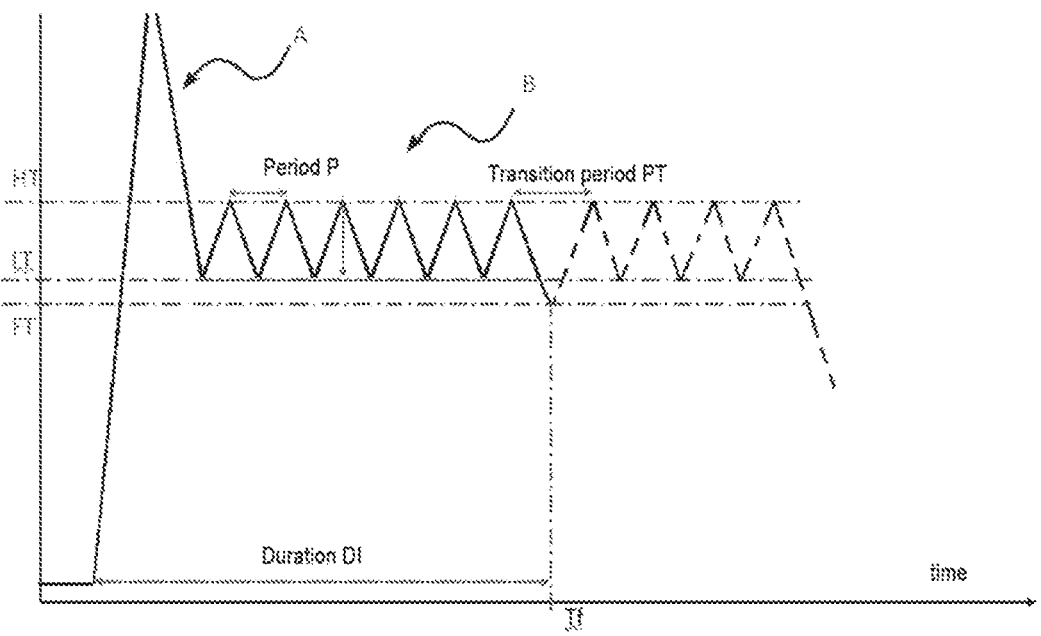
FIG. 4 shows one example of variation in the injection control signal delivered to an injector of an engine, by a converting device according to embodiments of the disclosure.

The measuring circuit 61, the detecting circuit (comparator 67), the signal generator 70 and the switching circuit 80 are, for example, produced according to the teaching of D1. FIG. 3 and FIG. 4 schematically show the variation over time in the original injection signal SI (solid lines) delivered by the control unit ECU, and the variation over time in the complementary signal SC (dashed lines) such as produced by the signal generator 70, the resulting signal corresponding to the adapted injection signal SM such as delivered to the injector 5 (a single injection cycle has been shown). FIG. 3 shows the signal SM produced by a converting device according to the teaching of D1, in a critical situation. FIG. 4 shows in a similar manner the variation in the adapted injection signal SM produced by the converting device according to embodiments of the disclosure.

In practice, as stated above, the original injection signals SI (solid lines) differ quite a lot from one engine to another and depending on the operating conditions of the engine, not only in their waveforms but also in their amplitudes or in their durations. However, all of them have a first phase A corresponding to a command to open the injector, followed by a second phase B (commonly called the holding phase), corresponding to a command to keep the injector open. In the first phase, the current increases from a minimum value, conventionally zero amps, passes through a maximum value and then decreases. The maximum value is of the order of a few amps to a few tens of amps, depending on the engine. In the second phase B, the current is regulated and oscillates between two values, a minimum value and a maximum value, a jet of pressurized fuel being sprayed into the injector throughout the second phase B. During the regulating phase B of the original injection signal, the amplitude of the original signal may vary substantially from one engine to another: the difference between the maximum value and the minimum value of the original injection signal (difference commonly called the holding amplitude) may thus vary from zero (no or very few oscillations) to a few tens of amps.

In the converting device of D1, the end of the original injection signal is detected when the original injection signal decreases and drops below an end threshold FT0 (FIG. 3). The threshold FT0 is predefined, and stored in the converting device at the time of its installation in a vehicle. However, during operation, the original injection signal may change and the threshold FT0 may become inappropriate. Thus, in the example of FIG. 3, where the value of the end threshold FT0 is much lower than the minimum value of the original signal in its regulating phase, the end of the original signal (time Tf0) is detected late and hence the complementary signal is generated late. In another example (not shown), where the value of the end threshold FT0 is much higher than the minimum value of the original signal in its regulating phase, the converting device considers the original signal to have ended (time Tf) well before the actual end of the original signal, interrupts transmission of the original injection signal and delivers an inappropriate complementary signal, notably one having a duration much shorter than the actual duration of the original signal. In both cases, the signal delivered by the converting device causes poor operation of the injector.

Embodiments of the disclosure improve the device of D1 so as to take account of the fact that the original injection signal may vary over time, in duration and in amplitude, during operation of an engine. To this end, the analyzing circuit 60 comprises an updating circuit 68b arranged to determine parameters of the signal measured by the measuring circuit 61, and to update in real time parameters necessary for production of the complementary injection signal.

According to one implemented variant, the analyzing circuit comprises a memory 68a for storing the measured signal, and the updating circuit 68b determines parameters of the measured and stored signal. According to another variant (not shown), the updating circuit 68b determines parameters of the signal measured on the fly, as the measurement is performed by the circuit 61.

The updating circuit 68b may also be arranged to determine, in a regulating phase of the original injection signal, a maximum value Vmax and a minimum value Vmin of the measured signal, and arranged to update a value of a high threshold HT and a value of a low threshold LT depending on the maximum value Vmax and on the minimum value Vmin of the measured signal, respectively, and the signal generator 70 may be arranged to produce the complementary injection signal SC such that it varies between the high threshold HT and the low threshold LT. Since the measured signal is proportional in amplitude to the original injection signal, the maximum value Vmax and the minimum value Vmin of the measured signal are proportional to a maximum value and to a minimum value of the original injection signal SI, respectively. Thus, the complementary signal SC produced by the signal generator 70 varies between the same high and low extremes as the original injection signal. As a safety measure, the circuit 68b may be arranged to update the value of the high threshold HT to a ceiling value HTM if it determines a maximum value Vmax higher than a maximum acceptable value. Similarly, the circuit 68b may be arranged to update the value of the low threshold LT to a floor value LTm if it determines a minimum value Vmin lower than a maximum acceptable value. This ensure the circuits located downstream of the updating circuit 68b operate safely in case of malfunction of the updating circuit 68b or of circuits located upstream of the updating circuit (for example, the measuring circuit 61).

The updating circuit 68b may also be arranged to determine, in the regulating phase of the original injection signal, an updated period P of the measured signal, and the signal generator 70 may be arranged to produce the periodic complementary injection signal SC such that it has a period P. Thus, the complementary signal SC produced by the generator 70 has the same waveform (periodic signal) as the original injection signal.

The updating circuit 68b is firstly arranged to update a value of the end threshold FT depending on the signal measured by the measuring circuit 61.

According to one implemented embodiment, the updating circuit 68b is arranged to determine, in a regulating phase of the original injection signal, a maximum value Vmax and a minimum value Vmin of the measured signal, and is arranged to update the value of the end threshold FT so that $FT=Vmin-E*(Vmax-Vmin)$, where E is a predefined tolerance parameter. Experiments have shown that a tolerance parameter E set to less than 5% ensures correct injector operation, and that a parameter E set to less than or equal to 3% leads to optimum operation both of the injector and of the converting device. As a concrete numerical example, given by way of example and in no way limiting the invention, let an original injection signal SI the waveform of which is similar to that shown in FIG. 4 be considered. In the regulating phase B, the original signal SI varies between a minimum value $Vmin0=3.28$ A and a maximum value $Vmax0=4$ A, and SI has a period P. The holding amplitude $Acl0$ of the original signal is defined by the difference between the maximum value and the minimum value of the signal SI in the regulating phase: $Acl0=Vmax0-Vmin0=0.72$ A. Since the measured signal is proportional to the signal SI, the values Vmin, Vmax and $Acl=Vmax-Vmin$ of the measured signal are respectively equal to: $Vmax=K*Vmax0$, $Vmin=K*Vmin0$ and $Acl=K*(Vmax0-Vmin0)$ where K is a coefficient of proportionality. Furthermore, the end threshold $FT=Vmin-E*(Vmax-Vmin)$ of the measured signal corresponds to the end threshold $FT0=Vmin0-E*(Vmax0-Vmin0)$ of the signal SI, namely, in this numerical example, $FT0=3.28-0.03*(0.72)=3.26$ A if the tolerance parameter E is equal to 0.03, i.e., to 3%.

According to one alternative, the updating circuit is arranged to determine, in a regulating phase of the original injection signal, a minimum value Vmin of the measured signal, and is arranged to update the value of the end threshold FT according to the relationship $FT=Vmin-E0$, where E0 is a predefined tolerance parameter. This alternative is easier to implement, but experiments have shown that it may yield poorer results over time, notably if the original injection signal varies a lot during operation of the engine.

The switching circuit 80 delivers the complementary injection signal produced by the signal generator 70 after having transmitted the original injection signal. In practice, the complementary signal and the original signal are offset by a transition period PT longer than the period P of the original signal. Where appropriate, the signal generator 70 is preferably arranged to produce the periodic complementary injection signal SC of period P such that the transition period PT (FIG. 4) between the original injection signal SI and the complementary injection signal SC is less than 1.2 times, and preferably less than 1.1 times, the period P. The complementary signal is thus as transparent to the injector as possible.

According to one mode of implementation, the converting device, according to embodiments of the disclosure, also comprises a probe (not shown) arranged to measure a richness R of the second fuel, and the signal generator 70 is arranged to produce the complementary injection signal in such a way that its duration is dependent on the richness of the second fuel and on the duration of the original injection signal.

The duration of the complementary signal is, for example, equal to $DIC=TX*DI$, where TX is an enrichment ratio and DI is a duration of the original injection signal.

TX is a ratio dependent on the richness of the second fuel. It may also depend on intrinsic parameters of the engine, on intrinsic parameters of the vehicle (e.g., weight, etc.) in which the engine is installed, or even on how the engine is used (e.g., driven most often in town or on the highway). In one example, the enrichment ratio is chosen to be proportional to the measured richness of the second fuel: $TX=TX0*(R0-R)$, where R0 and TX0 are predefined initial values of richness and of enrichment ratio. The enrichment ratio TX may be updated through a measurement of the richness R of the second fuel taken by the richness probe during the first injection cycle after the engine is started, or indeed more regularly in each injection cycle throughout operation of the engine. The enrichment ratio is chosen to be limited between $TX=0$ to 40%, and preferably between 10 and 30% to ensure the safety of the injector.

DI is the duration of the original signal. In the example of FIG. 4, the duration of the original signal is determined between the start time and the end time of the original signal, i.e., between the start of phase A and the end of phase B of the original signal. As a variant, in the device shown in FIG. 2, the duration of the original signal is considered to be between the start and end of the regulating phase of the signal SI: a comparator 63a is arranged to detect the start of the regulating phase when the measured signal decreases and drops below the high threshold HT, the comparator 67 detects the end of the regulating phase and a measuring circuit 63c determines the injection duration DI corresponding to the time between the start and end of the regulating phase of the signal SI.

For the sake of simplification, a single injector of an engine has been shown in FIG. 1. In a conventional engine comprising N injectors, for example four or six injectors, the schematic of FIG. 1 may be duplicated N times: the converting device according to embodiments of the disclosure then comprises N pairs of input terminals, each connected to corresponding pairs of terminals of the control unit ECU, and N pairs of output terminals, each connected to a pair of terminals of an injector; inside the converting device, the analyzing circuit, the current generator and the switching circuit may likewise be duplicated, this allowing each injector to be driven independently of the others. As a variant, the device according to embodiments of the disclosure may comprise N current generators and N switching circuits, one current generator and one switching circuit being associated with the electrical supply of one of the N injectors of the engine, and a single analyzing circuit 60 for analyzing the original injection signal associated with one of the N injectors and delivering analysis results (high threshold, low threshold, etc.) to each of the N current generators.

The analyzing circuit 60 may also comprise a communication interface 66, arranged to exchange information with a remote terminal (displaying, for example, a graphical interface for a user) by known means such as, for example, a wire link (e.g., link via a USB cable) or a wireless link (e.g., a Bluetooth link). Lastly, the analyzing circuit 60 may comprise a control circuit 65:
- arranged to receive all the signals delivered by the measuring circuit 61, the comparator 67, the circuit 68 (comprising the memory 68a and the updating circuit 68b) and, where appropriate, by the comparator 63a and the measuring circuit 63c,
- arranged to receive parameters potentially provided by a user (such as an identifier of the engine, the tolerance parameter E, initial values of the high threshold HT, of the low threshold LT, of the end threshold FT, of the richness R and of the enrichment ratio TX, the minimum value of the low threshold and the maximum value of the high threshold HT, the tolerance parameter E, the minimum value and the maximum value of the enrichment ratio TX, etc.) and
- arranged to produce a control signal for driving the signal generator 70.

The control circuit 65 notably comprises a data memory, for storing predefined parameters such as the tolerance parameter, the enrichment ratio, etc. The data memory may also store a database containing, for every known engine (or type of engine) as identified by an identifier, initial parameters associated with the engine such as initial values of the high threshold HT, of the low threshold LT, and of the end threshold FT, the minimum value of the low threshold and the maximum value of the high threshold HT, the tolerance parameter E, the minimum value and the maximum value of the enrichment ratio TX, etc. In the context of embodiments of the disclosure, the data memory may also store the updated values of the high and low thresholds HT, LT and/or of the duration DCI of the complementary signal that are delivered by the updating circuit 68b with a view to producing the complementary injection signal.

The control circuit 65 also comprises a program memory comprising a plurality of code lines suitable for implementing the method according to embodiments of the disclosure and for driving all the circuits of the converting device, as described below.

Figure 5:
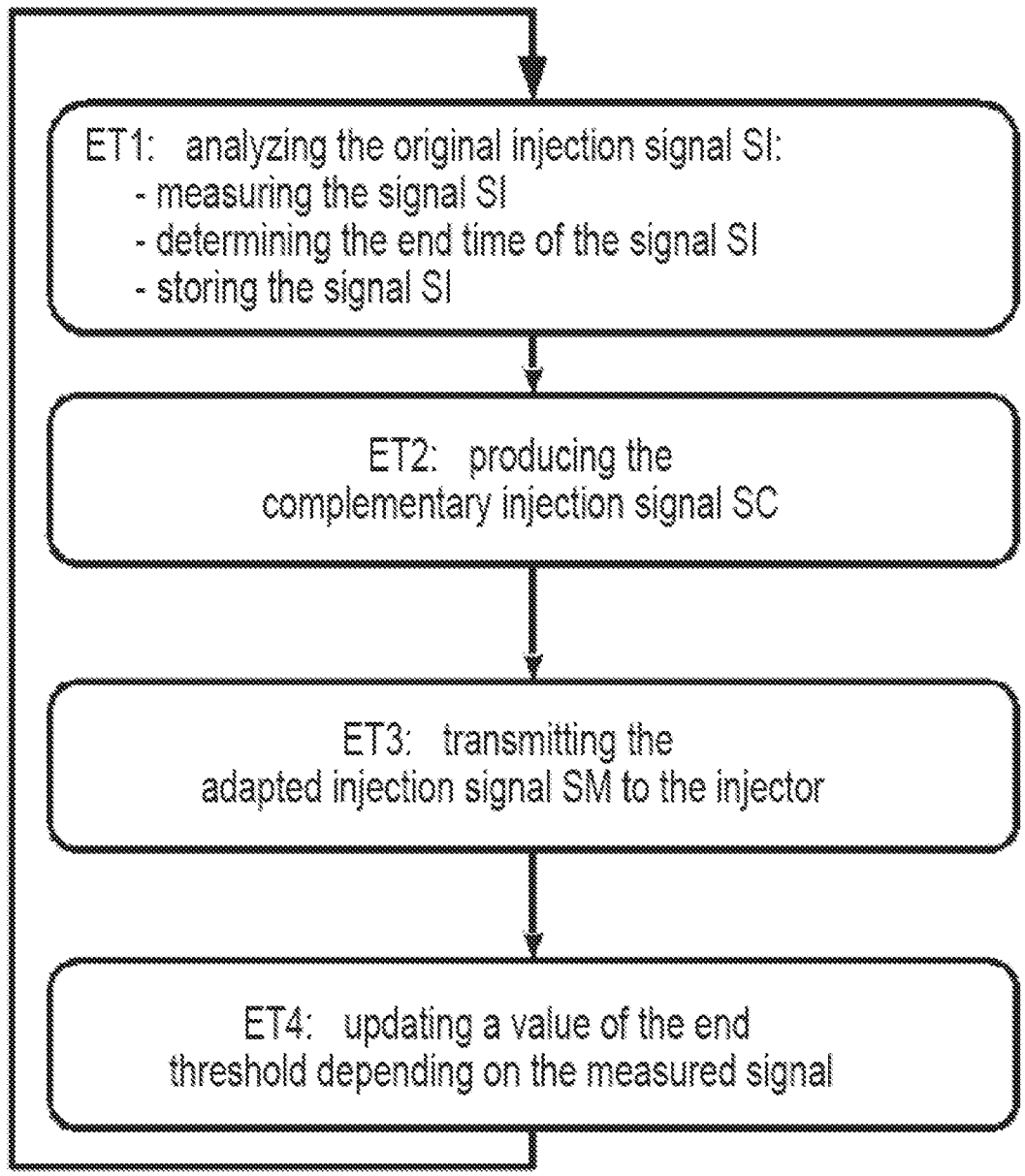
FIG. 5 is a schematic representation of the main steps of a method according to embodiments of the disclosure.

The converting device, according to embodiments of the disclosure, may be used to implement a converting method according to embodiments of the disclosure, consisting in (FIG. 5):

ET1: measuring the original injection signal SI and detecting an end time Tf of the original injection signal SI when the measured signal decreases and drops below an end threshold FT, ET2: producing a complementary injection signal SC starting from the end time of the original injection signal SI, and ET3: in succession, transmitting the original injection signal SI to the injector then delivering the complementary injection signal SC to the injector, the original injection signal SI and the complementary injection signal SC together forming the adapted injection signal SM, the method being characterized in that it also comprises a step ET4 of:

ET4: updating a value of the end threshold depending on the measured signal.

Steps ET1 (analysis of the original injection signal SI) and ET2 (production of the complementary signal SC) are carried out in succession, and step ET3 (delivery of the signal SI and then of the signal SC) is carried out in parallel with steps ET1 and ET2. Step ET4 (update of the end threshold) is carried out in parallel with step ET1, step ET2 or step ET3. Step ET1 may also comprise storing the measured signal.

Steps ET1 to ET3 are repeated in each injection cycle, i.e., in each cycle of the original injection signal, preferably throughout operation of the engine.

Regarding step ET4:

step ET4 may be carried out during a first cycle of the original injection signal; this makes it possible to update at least the end threshold of the original injection signal at the moment the engine is started; and/or step ET4 may be repeated in each cycle of the original injection signal; this makes it possible to update in real time at least the end threshold of the signal SI during operation of the engine.

Preferably, in step ET4, in a regulating phase of the original injection signal, a maximum value Vmax and a minimum value Vmin of the measured signal are determined and a value of a high threshold HT and a value of a low threshold LT are updated depending on the maximum value Vmax and on the minimum value Vmin of the measured signal, respectively, and, in step ET2, the complementary injection signal is produced such that it varies between the high threshold (HT) and the low threshold (LT).

Also preferably, in step ET4, in a regulating phase of the original injection signal, an updated period of the measured signal is determined and, in step ET2, the periodic complementary injection signal (SC) is produced such that it has a period P.

In step ET4, the value of the end threshold FT may be updated so that $FT = Vmin - E*(Vmax - Vmin)$, where E is a predefined tolerance parameter.

The method may also comprise a parameterizing step ET01, consisting in selecting at least one parameter from a set of parameters comprising: a parameter identifying the engine, a parameter identifying the type of engine, a parameter identifying a fuel, a parameter identifying a type of fuel, the tolerance parameter, an initial value of the high threshold HT, an initial value of the low threshold LT, an initial value of the end threshold FT, an initial value of the enrichment ratio TX.

The initial values of the high threshold HT, of the low threshold LT, of the end threshold FT and/or of the enrichment ratio TX are used the first time steps ET1 to ET3 are carried out; in parallel, the values of the high threshold HT, of the low threshold LT, of the end threshold FT and/or of the enrichment ratio TX are determined and updated in step ET4 by the updating circuit 68b (acquisition). The updated values of the high threshold HT, of the low threshold LT, of the end threshold FT and/or of the enrichment ratio TX are then available for the following injection cycles, and re-updated regularly by the updating circuit.

The parameterizing step ET01 may be performed by a user, for example, using a user interface (also called a human/machine interface or H/M interface) allowing the user to enter parameters or initial parameter values necessary for the operation of the converting device. These initial parameters then make it possible to calibrate the measuring circuits, to parameterize the threshold-determining circuit, the control circuit, etc.

LIST OF REFERENCE SIGNS 5 injector
6 control unit
60 analyzing circuit
61 current-measuring circuit
63a comparator
63c time-measuring circuit
65 control circuit
66 communication interface
67 comparator
68 circuit comprising a memory 68a and an updating circuit 68b
70 signal generator
80 switching circuit
81, 82 first and second protective devices
A, B first phase and second phase of an original injection signal
SI original injection signal
SC complementary injection signal
SM adapted injection signal
HT, LT, FT high threshold, low threshold, end threshold
HS, LS signals produced by the comparators 63a, 67
Vmax, Vmin maximum value, minimum value of the measured signal
E tolerance parameter
R richness
TX enrichment ratio
DI duration of the initial injection signal
DIC duration of the complementary injection signal

The invention claimed is:

1. A converting device for converting a fuel-injection engine initially intended to operate with a first fuel, the converting device allowing a user to make the engine operate with a second fuel of a composition different from a composition of the first fuel, the converting device being arranged to deliver, on a basis of an original injection signal received from an engine control unit, an adapted injection signal to an injector of the engine, the converting device comprising:
   an analyzing circuit for analyzing the original injection signal, the circuit comprising a measuring circuit for measuring the original injection signal and a detecting circuit arranged to detect an end time of the original injection signal when the measured signal decreases and drops below an end threshold;
   a signal generator arranged to produce a complementary injection signal starting from the end time of the original injection signal; and
   a switching circuit arranged to, in succession, transmit the original injection signal to the injector then deliver the complementary injection signal to the injector, the original injection signal and the complementary injection signal together forming the adapted injection signal,
   wherein, the analyzing circuit also comprises an updating circuit arranged to update a value of the end threshold depending on the measured signal.

2. The converting device of claim 1, wherein the updating circuit is also arranged to determine, in a regulating phase of the original injection signal, a maximum value and a minimum value of the measured signal, and arranged to update a value of a high threshold and a value of a low threshold depending on the maximum value and on the minimum value of the measured signal, respectively, and wherein the signal generator is arranged to produce the complementary injection signal such that it varies between the high threshold and the low threshold.

3. The converting device of claim 2, wherein the updating circuit is also arranged to determine, in the regulating phase of the original injection signal, an updated period of the measured signal, and wherein the signal generator is arranged to produce the complementary injection signal as a periodic complementary injection signal such that it has a period.

4. The converting device of claim 3, wherein the signal generator is arranged to produce the periodic complementary injection signal of the period such that a transition period between the original injection signal and the complementary injection signal is less than 1.2 times the period.

5. The converting device of claim 1, wherein the updating circuit is arranged to determine, in a regulating phase of the original injection signal, a maximum value (Vmax) and a minimum value (Vmin) of the measured signal, and is arranged to update the value of the end threshold (FT) so that FT=Vmin−E*(Vmax−Vmin), where E is a predefined tolerance parameter.

6. The converting device of claim 5, wherein the predefined tolerance parameter E is chosen to be less than 5%.

7. The converting device of claim 1, further comprising a probe arranged to measure a richness of the second fuel, the converting device being arranged to produce the complementary injection signal in such a way that a duration thereof is dependent on the richness of the second fuel.

8. A method for converting a fuel-injection engine initially intended to operate with a first fuel, the converting method allowing a user to make the engine operate with a second fuel of a composition different from a composition of the first fuel, the converting method comprising using the converting device of claim 1, the converting device being arranged to receive the original injection signal from the engine control unit and to produce the adapted injection signal, the method comprising:
   measuring the original injection signal and detecting the end time of the original injection signal when the measured signal decreases and drops below the end threshold;
   producing the complementary injection signal starting from the end time of the original injection signal;
   in succession, transmitting the original injection signal to the injector, then delivering the complementary injection signal to the injector, the original injection signal and the complementary injection signal together forming the adapted injection signal; and
   updating the value of the end threshold depending on the measured signal.

9. The method of claim 8, wherein the measuring, the producing, and the transmitting then delivering acts are repeated in each cycle of the original injection signal.

10. The method of claim 8, wherein the updating is carried out in parallel with the measuring, the producing, or the transmitting then delivering.

11. The method of claim 8, wherein:
   the updating is carried out in a first cycle of the original injection signal; and/or
   the updating is repeated in each cycle of the original injection signal.

12. The method of claim 8, wherein, in the updating, in a regulating phase of the original injection signal, a maximum value (Vmax) and a minimum value (Vmin) of the measured signal are determined and a value of a high threshold and a value of a low threshold are updated depending on the maximum value (Vmax) and on the minimum value (Vmin) of the measured signal, respectively, and, in the producing, the complementary injection signal is produced such that it varies between the high threshold and the low threshold.

13. The method of claim 8, wherein, in the updating, in a regulating phase of the original injection signal, an updated period of the measured signal is determined and, in the producing, the complementary injection is produced as a periodic complementary injection signal such that it has a period.

14. The method of claim 12, wherein, in the updating, the value of the end threshold (FT) is updated so that FT=Vmin−E*(Vmax−Vmin), where E is a predefined tolerance parameter.

15. The converting device of claim 1, wherein the second fuel comprises:
   a bioethanol fuel, or
   a mixture of unleaded fuel and bioethanol fuel.

16. The converting device of claim 3, wherein the signal generator is arranged to produce the periodic complementary injection signal of the period such that a transition period between the original injection signal and the complementary injection signal is less than 1.1 times the period.

17. The converting device of claim 5, wherein the predefined tolerance parameter E is chosen to be less than 3%.

* * * * *